Dec. 3, 1946.                    G. L. LARISON                    2,411,885
                        EQUALIZING SUSPENSION FOR VEHICLES
                    Filed Nov. 30, 1943            6 Sheets-Sheet 2

GLENN L. LARISON
INVENTOR

BY Geisler and Geisler
ATTORNEYS

Dec. 3, 1946.  G. L. LARISON  2,411,885
EQUALIZING SUSPENSION FOR VEHICLES
Filed Nov. 30, 1943  6 Sheets-Sheet 3
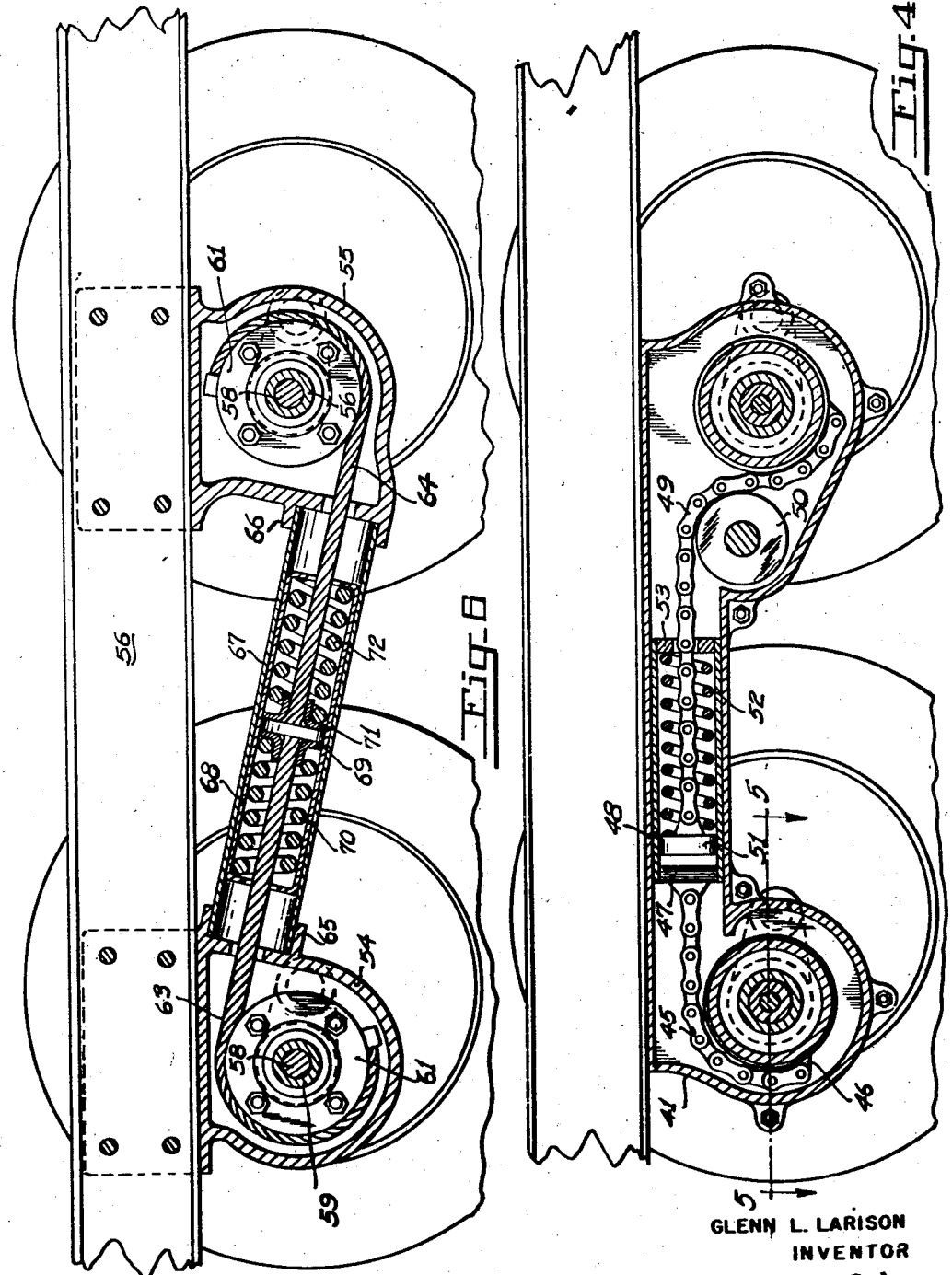
GLENN L. LARISON
INVENTOR
BY *Geisler and Geisler*
ATTORNEYS Dec. 3, 1946.    G. L. LARISON    2,411,885
EQUALIZING SUSPENSION FOR VEHICLES
Filed Nov. 30, 1943    6 Sheets-Sheet 4

GLENN L. LARISON
INVENTOR

BY Geisler and Geisler
ATTORNEYS

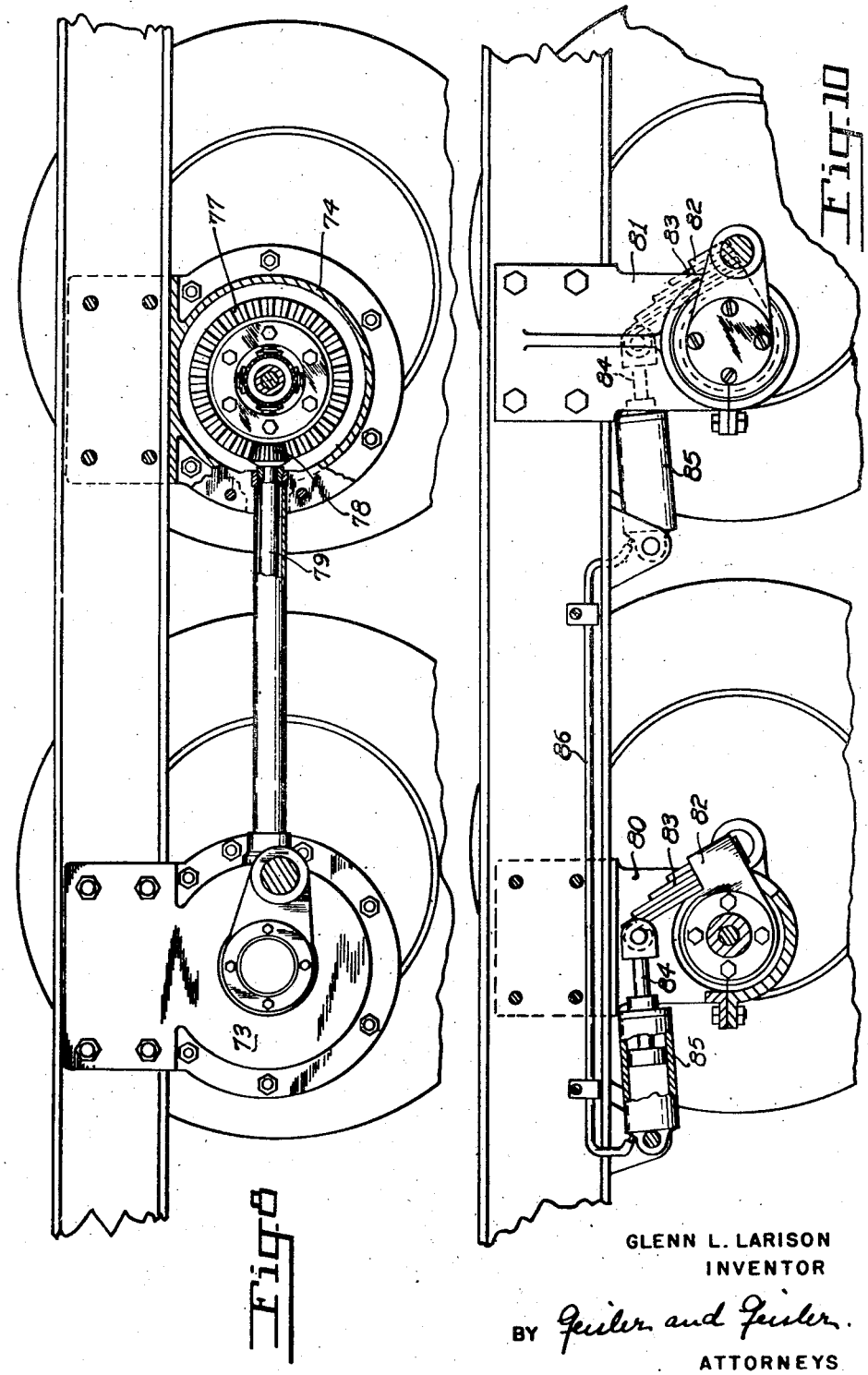

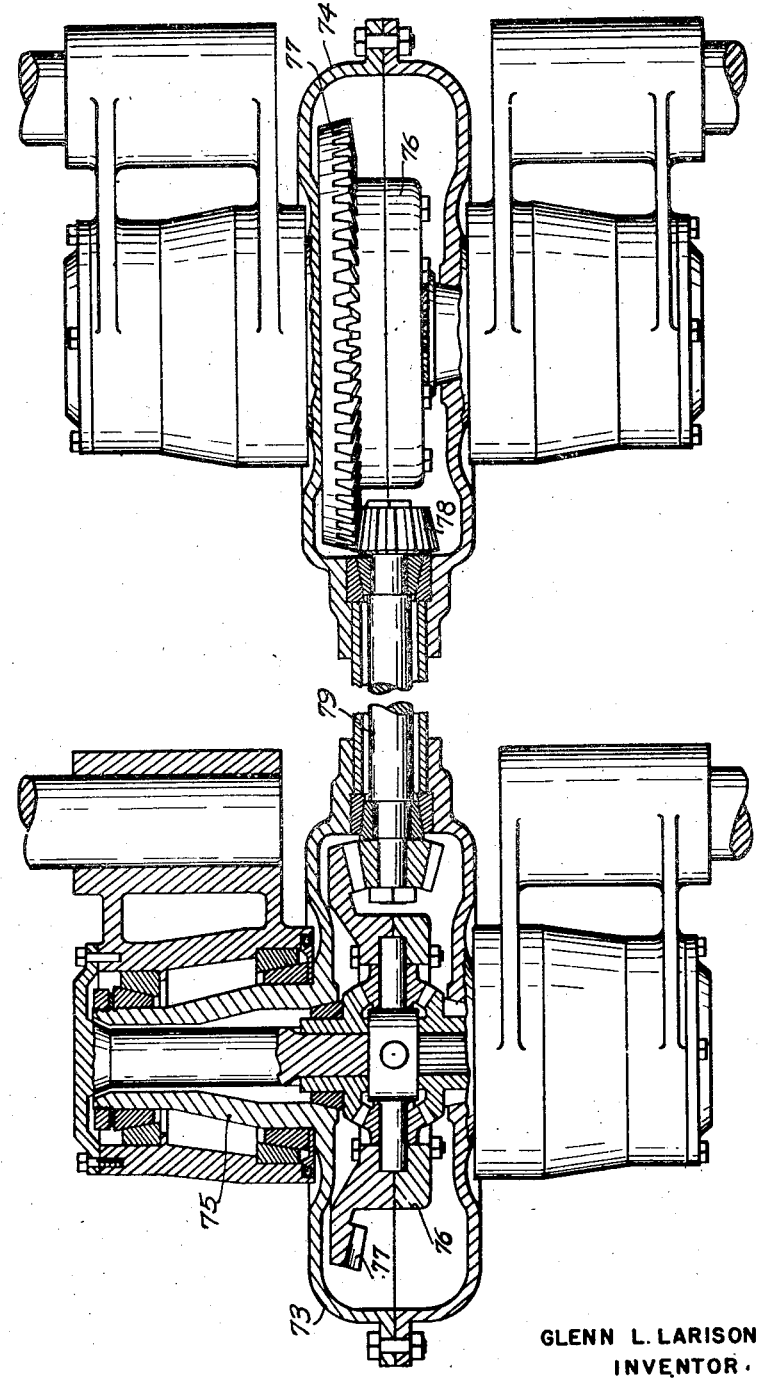

Patented Dec. 3, 1946

2,411,885

UNITED STATES PATENT OFFICE 2,411,885

EQUALIZING SUSPENSION FOR VEHICLES

Glenn L. Larison, La Grande, Oreg., assignor to Larison Compensating Axle Corporation, a corporation of Oregon Application November 30, 1943, Serial No. 512,353

4 Claims. (Cl. 280—104.5)

1

The present invention relates broadly to vehicle suspensions employing a minimum of two pairs of wheels at each side, with the wheels of each pair connected by compensating mechanism so that each wheel of the pair will carry an equal load, and with equalizing means between the two pairs of wheels, so that the load at that side of the vehicle will be distributed among all four wheels. Such an equalizing vehicle suspension may be attained by mounting a pair of wheel-carrying assemblies, interconnected by compensating means, at each end of a "walking beam." Another form of equalizing vehicle suspension is described in my U. S. Letters Patent No. 2,284,665, issued under date of June 2, 1942, and entitled "Vehicle suspension," in which a comparatively small, longitudinally extending, rocker bar is substituted in place of the conventional "walking beam."

The principal object of the present invention is to provide further improved equalizing vehicle suspension, in substitution for the conventional "walking beam," in which the two pairs of wheel-carrying assemblies and their compensating mechanisms in tandem arrangement on the same side of the vehicle will be connected by equalizing means accomplishing the same purpose and result as a "walking beam" suspension but dispensing with the actual "walking beam."

The manner in which this object and other advantages are attained by my improved equalizing suspension will be described briefly with reference to the accompanying drawings in which:

Fig. 1 is a side elevation of two pairs of wheel-carrying assemblies, mounted in tandem arrangement on the same side of the vehicle, with the near-side wheels of both pairs being removed for the sake of clarity, this view being taken on line 1—1 of Fig. 1A and showing one way in which the compensating or differential mechanisms for the two pairs of assemblies may be connected to provide an equalizing suspension;

Fig. 4 is a sectional side elevation of a vehicle suspension employing a different mounting for the wheel-carrying assemblies and showing a modified equalizing means connecting the compensating mechanisms for the two pairs of wheel-carrying assemblies;

Fig. 6 is a sectional side elevation of another vehicle suspension embodying my invention;

Fig. 8 is a side elevation partly in section of a further modified form of vehicle suspension embodying my invention;

Fig. 9 is a fragmentary plan view, partly in section of the suspension shown in Fig. 8 for one side of the vehicle; and Fig. 10 is a side elevation of a still further modified form of vehicle suspension embodying my invention in which hydraulic mechanism is used as part of the equalizing means between the two compensating mechanisms.

Figure 1:
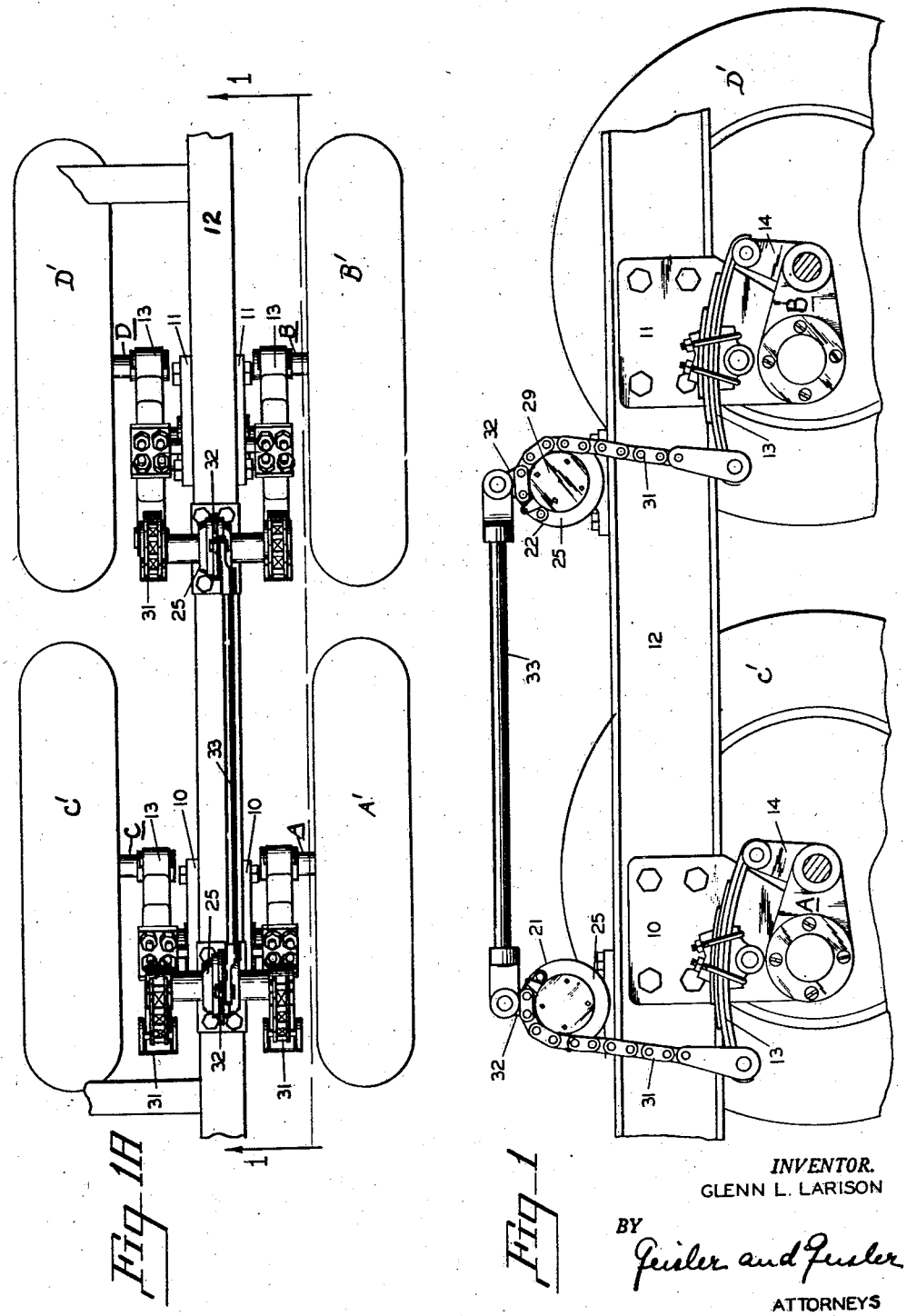
Fig. 1A is a fragmentary plan view, drawn to a slightly smaller scale, of one side of the vehicle frame with the top deck or platform of the vehicle removed for the sake of clarity, showing the two pairs of wheels and their wheel-carrying assemblies on that side of the vehicle.
Figure 3:
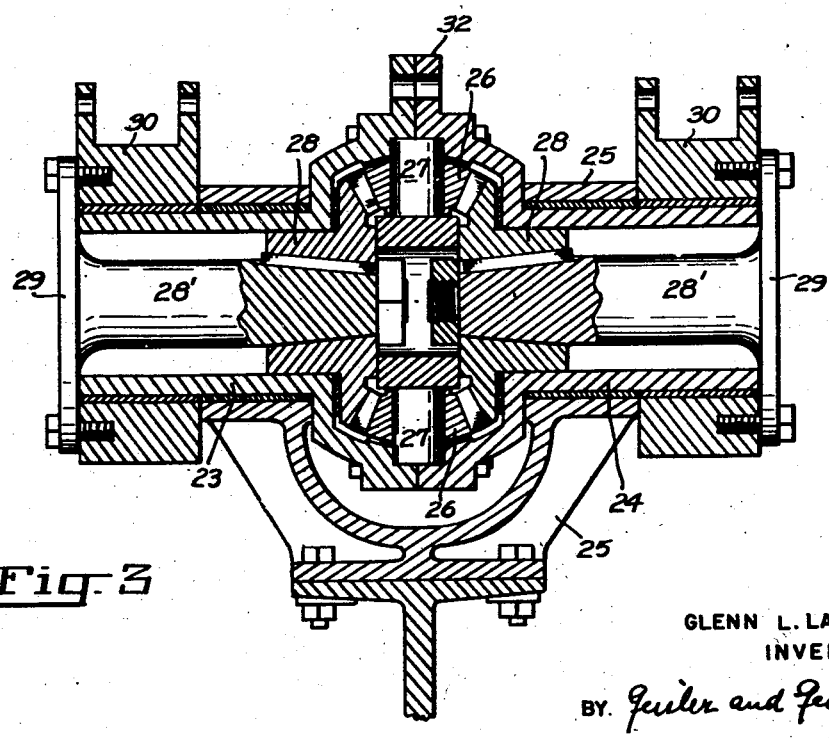
Fig. 3 is a transverse sectional elevation of one of the compensating mechanisms of Figs. 1 or 2.

Referring first to Figs. 1 and 1A, the forward and rear pairs of wheel-carrying assemblies which are designated in general by the reference characters A and C and B and D, and which support the vehicle wheels A', C', B', D' respectively, are hingedly mounted on brackets 10 and 11 respectively for movement in parallel vertical planes. The brackets 10 and 11 are rigidly secured to a side frame member 12 of the vehicle. A pair of leaf springs 13 carried in cradles are pivotally mounted on each bracket in the same vertical planes as the wheel-carrying assemblies respectively, one end of each leaf spring being connected to the spindle-carrying end of the corresponding wheel-carrying assembly by a link 14. This mounting of the wheel-carrying assemblies is similar to that described in my U. S. Letters Patent No. 2,226,100, issued under date of December 24, 1940, entitled "Vehicle wheel mounting" and in my U. S. Letters Patent No. 2,284,665, issued under date of June 2, 1942, entitled "Vehicle suspension." The other ends of the leaf springs are connected by sprocket chains 31 to differential mechanisms. The pair of springs for the forward pair of wheel-carrying assemblies A and C are connected to the differential mechanism 21 while those of the pair of springs for the rear pair of wheel-carrying assemblies B and D are connected to the differential mechanism 22. The differential mechanisms 21 and 22 are each carried in a rotatable housing or case so that each differential mechanism can also rotate as a single unit. The construction and mounting of each differential is shown in Fig. 3. The differential housing comprises the two companion sections 23 and 24 which are secured together and rotatably mounted in the bracket 25. The differential mechanism within the housing is of well-known construction and includes a plurality of differential pinions 26 journaled on stub shafts 27 firmly secured to the housing, which pinions mesh with a pair of differential gears 28 secured to the shafts 28'. The outer ends of the shafts terminate in enlarged circumferential flanges 29. Pulleys 30 are rotatably mounted on opposite ends of the differential housing 25 and are connected to the circumferential flanges 29 by cap screws or other suitable means. Sprocket chains 31 (Fig. 1) have one end attached to a pulley 30 and the other end connected with a leaf spring 13. The rotatable housing of each differential is formed with an arm 32 and the equalizing link 33 is pivotally connected to each of these arms.

It will be apparent from Fig. 1 that upward movement of either of the wheel-carrying assemblies of the forward pair will, when transmitted through the differential mechanism 21, cause a force to be exerted in the opposite direction on the other wheel-carrying assembly of the pair, but that when both of these wheel-carrying assemblies are moved upward simultaneously such movement, unless entirely cushioned by the leaf springs, will cause the differential mechanism 21 to be rotated as an entire unit counterclockwise (as viewed in Fig. 1). However, such rotation of the differential mechanism 21 as an entire unit will cause corresponding rotation of the differential mechanism 22 as an entire unit, due to the equalizing link 32, and this in turn will exert a force tending to move the rear pair of wheel-carrying assemblies downwardly. Thus this vehicle suspension acts in the same manner as a "walking beam" construction equalizing the load between the front and rear pairs of wheels, and, due to the compensating or differential mechanism connecting the two wheel-carrying assemblies of each pair, the load on this side of the vehicle will be divided between the four wheel-carrying assemblies.

Figure 2:
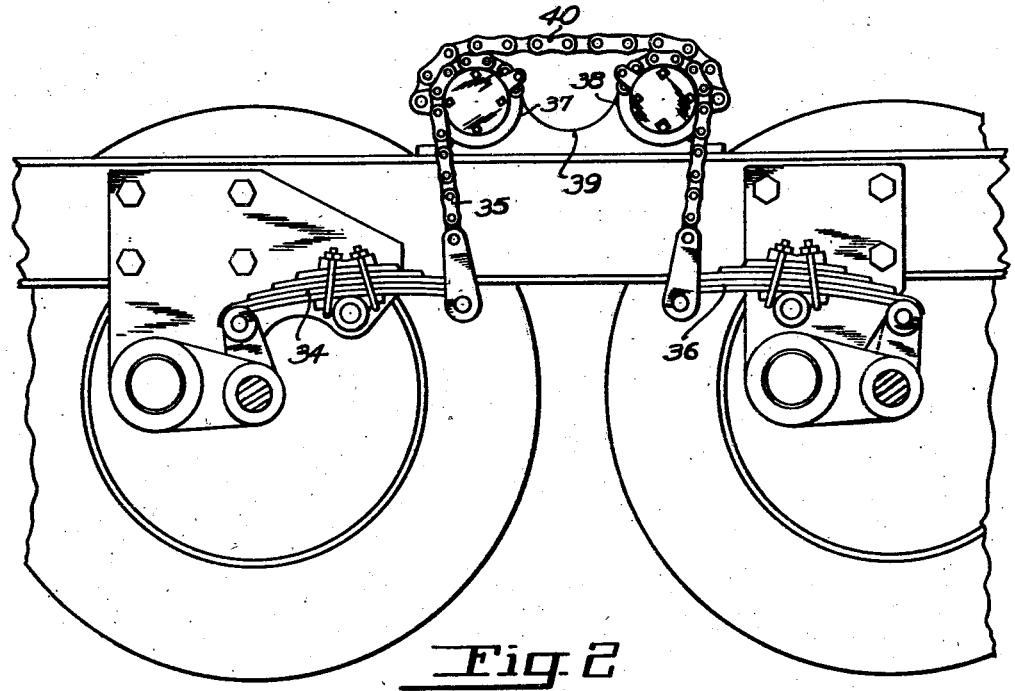
Fig. 2 is a side elevation of a vehicle assembly, with the near-side wheels removed, showing wheel-carrying assemblies somewhat similarly mounted and with compensating mechanisms similar to those of Fig. 1 but connected in a slightly different manner.

The vehicle suspension illustrated in Fig. 2 is similar to that of Fig. 1 with the exception that the position of the forward pair of pivotally mounted leaf springs 34 has been changed in order to bring the ends of the same, to which the sprocket chains 35 are connected, closer to the corresponding ends of the rear pair of leaf springs 36. The two differential mechanisms 37 and 38 are the same as the differential mechanisms 21 and 22 in Fig. 1 and similar to that shown in Fig. 3, but their housings for convenience are rotatably mounted in a single elongated bracket 39 secured on the vehicle frame. The rotatable housings of the two differential mechanisms are connected by the equalizing chain 40. This construction functions in exactly the same manner as the construction shown in Fig. 1 and offers the advantage of being somewhat more compact.

Figure 5:
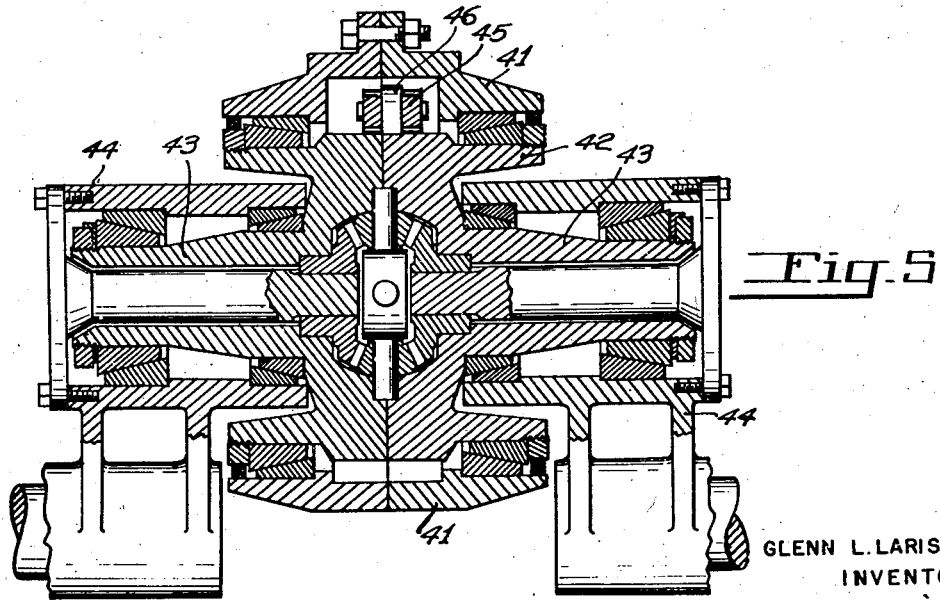
Fig. 5 is a sectional plan view of the mounting for the forward pair of wheel-carrying assemblies of Fig. 4 corresponding to the line 5—5 of Fig. 4.

Figs. 4 and 5 illustrate the carrying out of my invention with a different form of mounting for the two pairs of wheel-carrying assemblies as well as with a different equalizing means connecting the two differential mechanisms.

In the construction shown in Figs. 4 and 5 the equalizing means is carried entirely within a housing 41, preferably divided longitudinally into two identical half sections which are bolted together and secured to the vehicle frame. Each differential mechanism is mounted in a rotatable supporting member 42 (Fig. 5), also preferably formed in two half sections secured together, each half section having an elongated hub 43 on which a wheel-carrying assembly 44 is rotatably supported. The rotatable supporting member in turn is rotatably mounted in the housing 41.

A chain 45 (Fig. 4) has one end secured to an ear 46 of the rotatable supporting member for the forward differential mechanism and the other end of the chain is connected to a cylinder head 47 which in turn is removably secured to a floating or slidably-mounted cylinder 48. Another chain 49 is connected to the rotatable supporting member for the rear differential mechanism, passes over an idler pulley 50, supported within the housing 41, and is attached at its forward end to a piston 51 slidably disposed within the cylinder 48. The piston 51 is normally restrained against movement with respect to the cylinder 48 by a compression spring 52 located in the cylinder between the piston 51 and a ring or head 53 at the rear end of the cylinder. Thus partial rotation of the rotatable supporting member for one of the differential mechanisms, which would occur, for instance, when the wheels of both associated wheel-carrying assemblies were raised simultaneously in passing over a bump, would tend to produce rotational movement in the opposite direction of the supporting member for the other differential mechanism and consequently relatively downward movement of the other two wheel-carrying assemblies. This equalizing means accordingly functions in the same manner as an ordinary "walking beam" to divide the load between the two pairs of wheel-carrying assemblies, and furthermore functions as a spring "walking beam" since the spring 52 will act to cushion sudden shocks transmitted from one pair of wheel-carrying assemblies to the other.

Figure 7:
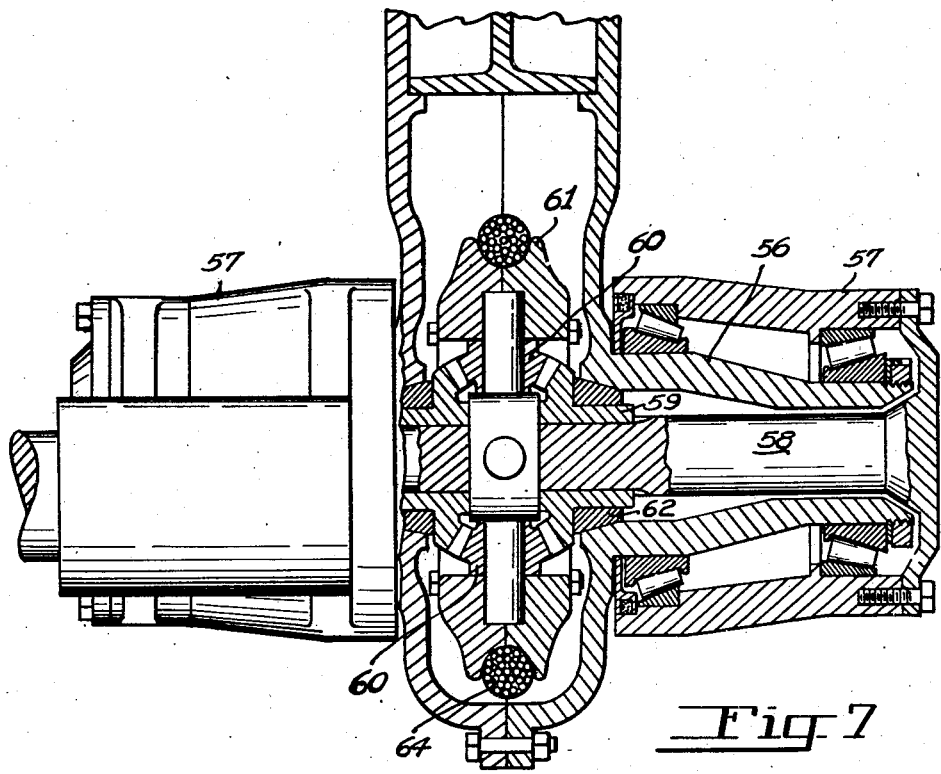
Fig. 7 is an end elevation, partly in section, of the mounting for the wheel-carrying assemblies in Fig. 6, the view being taken from the right in Fig. 6.

A further form in which my invention can be carried out is the vehicle suspension illustrated in Figs. 6 and 7. The mounting shown in Fig. 7 is the same as that shown in Fig. 2 of another companion application for patent which I have executed under the same date, entitled "Vehicle suspension," Serial No. 512,351, to which also reference is to be made. The mounting shown in Fig. 7 is described more fully and claimed as a mounting for a single pair of wheels in my application Serial No. 512,351.

In Fig. 6 the forward and rear differential mechanisms are mounted for rotational movement in brackets 54 and 55 respectively attached to the side member 56 of the vehicle frame, the rear bracket 55 being shown also in Fig. 7. Each bracket has elongated hub portions 56 (Fig. 7) in transverse axial alinement on which the wheel-carrying assemblies 57 are pivotally mounted. The differential mechanism is rotatably mounted within the bracket and includes a pair of axially-alined shafts 58, to the inner ends of which differential bevel gears 59 are keyed, and a plurality of differential pinions 60. The differential pinions are mounted on stub shafts secured in a differential casing 61. The entire differential mechanism is mounted for rotation by means of the bearings 62 disposed between the hubs of the bevel gears 59 and the supporting bracket. The outer periphery of the differential casing 61 is formed with a groove like a pulley to accommodate a control cable. The control cables 63 and 64 (Fig. 6) are attached to the differential casings of the forward and rear differential mechanisms respectively. The brackets 54 and 55 are so shaped and provided with integral flanges 65 and 66 respectively that a cylindrical housing 67 will be securely supported between the two brackets in the position shown in Fig. 6. A floating cylinder 68 is slidably supported within the cylindrical housing 67. The cable 63, connected to the rotatable casing of the forward differential mechanisms, is attached to a piston 69 slidable within the cylinder 68. A compression spring 70 is located between the piston 69 and the forward head of the cylinder 68 as shown. The cable 64, connected to the rotatable casing of the rear differential mechanism, is attached to a similar piston 71 in the cylinder 68, and a similar compression spring 72 is located between piston 71 and the rear head of cylinder 68. As obvious, this construction functions in the same manner as that of Fig. 4.

A rotatable shaft with suitable gear connections might also serve as an equalizing means connecting the two differential mechanisms in carrying out my invention. Figs. 8 and 9 illustrate such a construction. The forward and rear differential mechanisms are mounted for rotational movement in the housing brackets 73 and 74 respectively, the brackets having elongated hubs 75 on which the wheel-carrying assemblies are rotatably supported and connected to the ends of the differential mechanisms respectively in the manner described previously. Each differential mechanism has a differential casing 76 and each differential mechanism is mounted also for rotation as an entire unit. Each differential casing has a ring bevel gear 77 adapted to mesh with a bevel pinion 78 secured at one end of the shaft 79. Thus rotational movement of one differential casing will produce rotational movement in the opposite direction of the other differential casing and consequently an equalizing suspension, in which the vehicle load is divided between all four wheel-carrying assemblies, is attained.

It is possible to carry out my invention by using hydraulic means and an example of the manner in which this may be done is shown in Fig. 10. Each differential mechanism is carried in a rotatable housing member having elongated hubs on which the wheel-carrying assemblies are rotatably mounted respectively and the housing members in turn are mounted for rotational movement in the supporting brackets 80 and 81 secured to the vehicle frame. Each housing member is formed with an exterior, centrally-positioned socket 82 in which the end of a short leaf spring 83 is fixedly secured. The free end of each leaf spring 83 is pivotally connected to the end of a piston rod 84 of a hydraulic cylinder 85. Each hydraulic cylinder is pivotally connected to the vehicle frame. The two hydraulic cylinders are connected by a pipe 86, being joined to the respective ends of the pipe by means of suitable flexible hose connections. Thus, as evident from Fig. 10, counter-clockwise rotational movement of one of the differential mechanisms as a single unit, which would occur, for example, when the two wheel-carrying assemblies connected with that differential were raised simultaneously, will cause a force to be exerted through the hydraulic equalizing means to rotate the other differential mechanism as a single unit, and therewith the other two wheel-carrying assemblies, in the opposite direction, the result being the same as if the two differential mechanisms and the connected pairs of wheel-carrying assemblies were mounted on a "walking beam." Also, by providing the spring connections between the rotatably mounted differential mechanisms and the hydraulic pistons, the effect is the same as if a spring "walking beam" were employed as part of the vehicle suspension.

Obviously other modified constructions could be employed within the scope of my invention in providing a substitute for a "walking beam," with two pairs of wheel-carrying assemblies in tandem arrangement each interconnected by compensating means, and all elements cooperating to divide the load on that side of the vehicle between the four wheel-carrying assemblies. With my invention the same results are obtained as are possible with the use of a "walking beam" but the disadvantages in the employment of an actual "walking beam" are avoided.

I claim:

1. In a vehicle suspension, a pair of wheel-carrying assemblies pivotally mounted on the same side of the vehicle for movement in substantially vertical parallel planes, a differential mechanism located on the same side of the vehicle and mounted for rotational movement as an entire unit, said wheel-carrying assemblies connected with said differential mechanism, and said assemblies and differential mechanism so arranged that pivotal movement of one assembly will ordinarily result in opposite pivotal movement of the other assembly and pivotal movement of both assemblies in the same direction will result in rotational movement of said differential mechanism as an entire unit, a second pair of wheel-carrying assemblies pivotally mounted and in tandem with said first mentioned pair, a second differential mechanism located on the same side of the vehicle and mounted for rotational movement as an entire unit, said second pair of wheel-carrying assemblies connected to said second differential mechanism, and said second assemblies and second differential so arranged that pivotal movement of one of said second assemblies will ordinarily result in opposite pivotal movement of the other second assembly while pivotal movement of both second assemblies in the same direction will result in rotational movement of said second differential mechanism as an entire unit, and means interconnecting the two differential mechanisms controlling the movements of said mechanisms as entire units so arranged that rotational movement of one differential mechanism as an entire unit will cause a force to be exerted to produce related rotational movement of the other differential mechanism as an entire unit, whereby each assembly will be caused to carry its proper share of the load under all normal conditions of vehicle travel.

2. In a vehicle suspension, a pair of wheel-carrying assemblies pivotally mounted on the same side of the vehicle for movement in substantially vertical parallel planes, a differential mechanism located on the same side of the vehicle and mounted for rotational movement as an entire unit, said wheel-carrying assemblies connected with said differential mechanism, and said assemblies and differential mechanism so arranged that pivotal movement of one assembly will ordinarily result in opposite pivotal movement of the other assembly and pivotal movement of both assemblies in the same direction will result in rotational movement of said differential mechanism as an entire unit, a second pair of wheel-carrying assemblies pivotally mounted similarly to and in tandem with said first mentioned pair, a second differential mechanism located on the same side of the vehicle and similarly mounted for rotational movement as an entire unit, said second pair of wheel-carrying assemblies similarly connected to said second differential mechanism, and equalizing means interconnecting the two differential mechanisms so arranged that rotational movement of one differential mechanism as an entire unit will cause an equalizing force to be exerted to produce related rotational movement of the other differential mechanism as an entire unit, whereby each assembly will be caused to carry its proper share of the load under all normal conditions of vehicle travel.

3. The combination described in claim 1 with the addition of a resilient element in the means interconnecting the two differential mechanisms.

4. The combination described in claim 2 with hydraulically operated means included in said equalizing means.

GLENN L. LARISON.